United States Patent [19]

Solares

[11] Patent Number: 4,672,767

[45] Date of Patent: Jun. 16, 1987

[54] FISHING BALL

[76] Inventor: Bertha Solares, 915 Naples St., San Francisco, Calif. 94112

[21] Appl. No.: 630,854

[22] Filed: Jul. 13, 1984

[51] Int. Cl.$^4$ ............................................. A01K 97/04
[52] U.S. Cl. .................................................. 43/41.2
[58] Field of Search ...................... 43/41.2, 41, 4, 4.5, 43/43.11, 19, 1

[56] References Cited

U.S. PATENT DOCUMENTS

| | | | |
|---|---|---|---|
| 2,677,208 | 5/1954 | Newton | 43/43.11 |
| 3,065,563 | 11/1962 | Bascom | 43/19 |
| 3,163,957 | 1/1965 | Barrett | 43/41.2 |
| 4,484,405 | 11/1984 | Woods | 43/4.5 |

FOREIGN PATENT DOCUMENTS 75687 10/1949 Norway ..................................... 43/4

*Primary Examiner*—Gene P. Crosby

[57] ABSTRACT

An inflated rubber ball of tough material, about the size of a soccer ball, is kicked into the water. Attached to one side of the ball is a box. The bottom of the box is a trap door kept closed by a catch. Attached to the end of the trap door, where it opens, is the fishing line. The fishing line extends on into the box and is lodged there, with the fish-hook attached to it. When the trap door opens by jerking the fishline, the fishline with the hook drops into the water.

1 Claim, 4 Drawing Figures

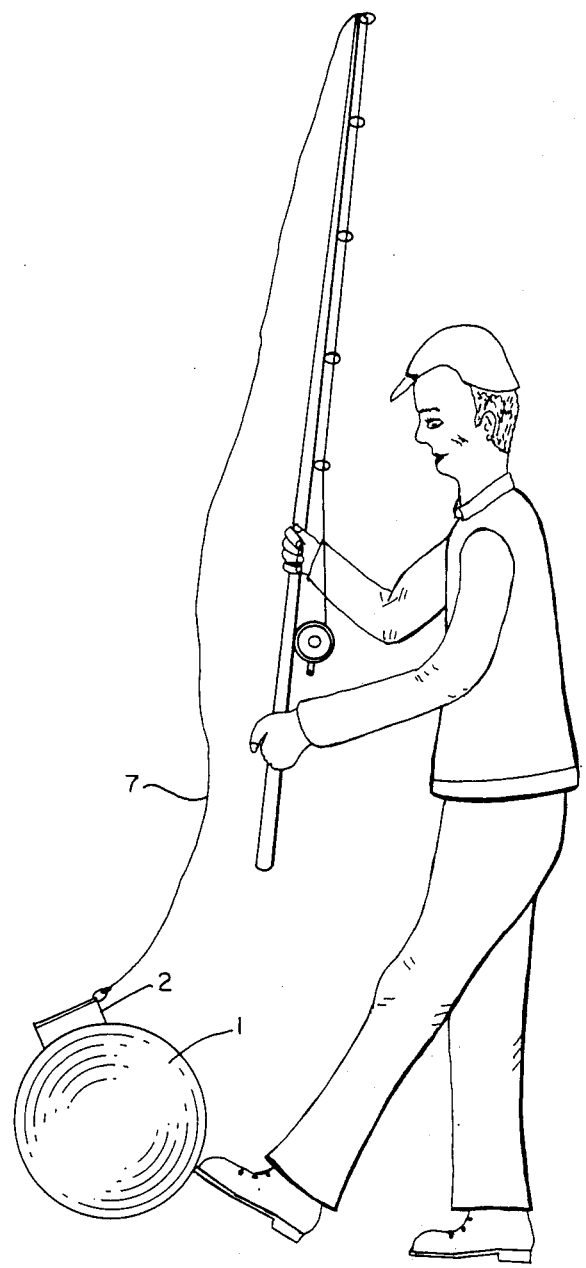
FIG.—1

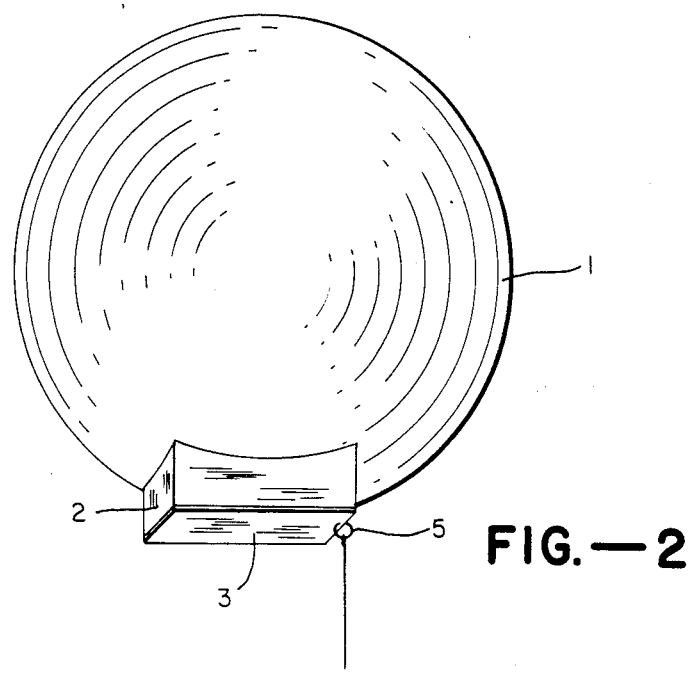
FIG.—2
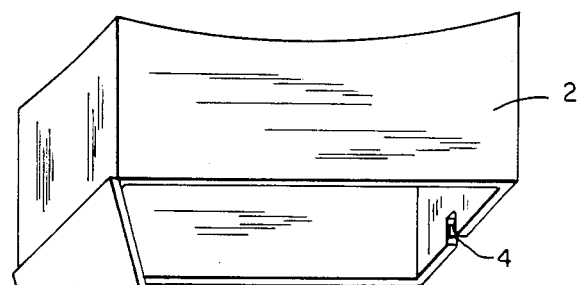
FIG.—3
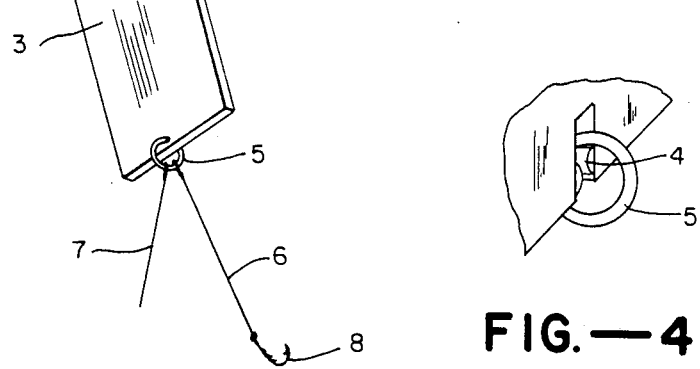
FIG.—4

FISHING BALL

BACKGROUND OF THE INVENTION

The present device solves the fisherman's age old problem of the impossibility of casting the line and hook far enough out into the water to reach the point where the fish are. The invention is bound to be welcomed by fishermen as an important aid to catching fish.

SUMMARY OF THE INVENTION

A rubber ball inflated with air is attached to one side of a box, and the bottom of the box is a trap door kept closed by a catch. The fishing line is attached to the trap door and extends on into the box with the fish hooks attached to it. The ball is placed on the ground and given a kick with the foot, making it go into the water as far as desired. A jerk to the fishing line will cause the trap door to open and the line and hook will drop into the water.

BRIEF DESCRIPTION OF THE DRAWINGS

FIG. 1 is a side view illustrating the ball being kicked into the water.

FIG. 2 is a perspective view showing the box closed.

FIG. 3 is a perspective view showing the lid in the open position.

FIG. 4 is an enlarged fragmentary view of the catch shown in FIG. 3.

DESCRIPTION OF THE PREFERRED EMBODIMENT

There is provided by this invention a free floating fishing rig in the form of a conventional fishing pole with spinning reel with an inflatable, spherical rubber or plastic ball, #1. A small plastic box #2 is attached to the ball by being glued on to it. The bottom of the box #3 is a hinged trap door, with a pressure catch #4 on the opposite side of the box. The pressure catch #4 is a conventional design having a tiny metal movable ball embedded on each of the two opposite sides of this pressure catch. The pressure catch holds the metal ring #5 firmly until the line #7 is jerked to release the trap door #3. The metal ring 5 is attached to the trap door #3, at the end that opens.

Attached to the ring #5 is the fishing line #7 that leads to the fishing pole. Attached separately to the ring #5 is the fishing line #6 that drops into the water with the fish hook #8 attached to the line. The fishing line #7 is wrapped twice around the box #2 to hold it in place until the line #7 is jerked to open the trap door.

The fishing line #6 with the hook #8 is stored inside the box #2 until the rig is kicked to the desired position on the water. The ball #1 when inflated is about the size of a soccer ball. The box #2 is just the right size to hold the fishing line #6 about 5 to 10 feet long. This line #6 is kept in the box #2 until ready to fish.

The ball #1 is placed on the shore. The fisherman standing beside the ball, gives a kick to the ball. It lands atop the water. The fisherman gives a quick jerk with the fishing pole. This causes the trap door #3 to open and the line #7 with the fish hook #8 attached—to drop into the water.

I claim:

1. A floating fishing rig for carrying a baited hook out into the water, comprising, an inflatable ball that will float on the water, said ball having a kicking surface, an attached box, said box having a curvature corresponding to the curvature of said ball secured thereto; a pivotal lid hinged to close said box; a catch member having portions on said lid and said box for releasably securing said lid to said box at a location opposite said hindge; a fishing line extending from a rod and reel to the lid portion of said catch member, and continuing and terminating at a fishing hook attached thereto, whereby the ball is kicked out into the water with the hook in said box, and the line from the rod and reel is jerked to release the hook from the box.

* * * * *